R. S. BRYANT.
RIM FOR VEHICLE WHEELS.
APPLICATION FILED APR. 25, 1912.
1,278,430.
Patented Sept. 10, 1918.
2 SHEETS—SHEET 1.
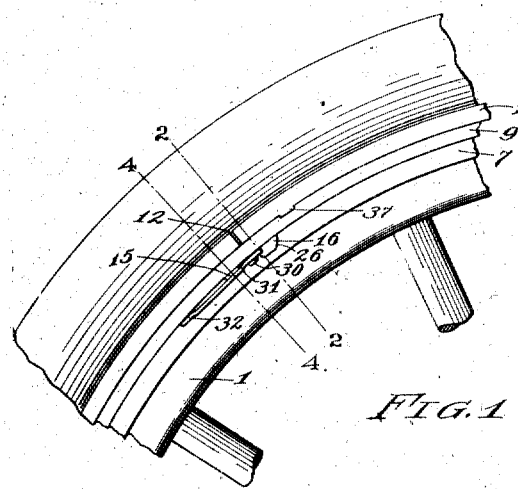
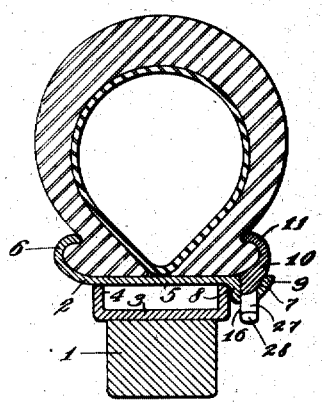
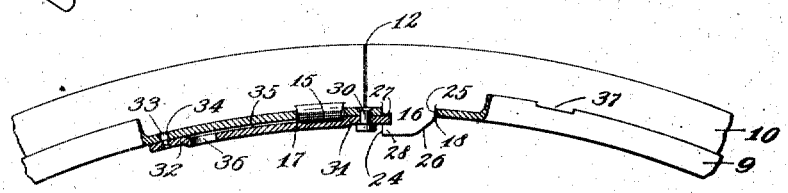
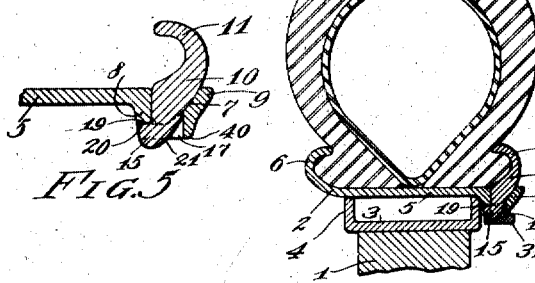
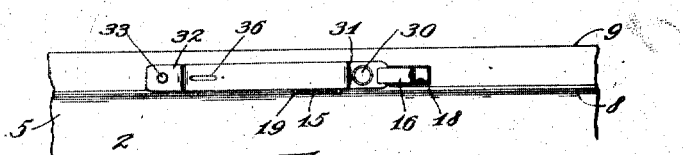
WITNESSES:
INVENTOR,
Richard S. Bryant
By Hull & Smith
ATTYS.

R. S. BRYANT.
RIM FOR VEHICLE WHEELS.
APPLICATION FILED APR. 25, 1912.
1,278,430.
Patented Sept. 10, 1918.
2 SHEETS—SHEET 2.
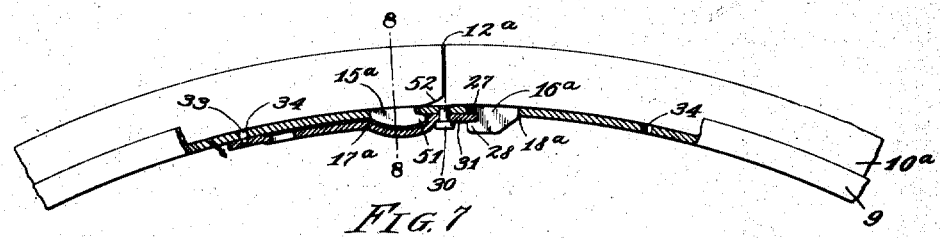
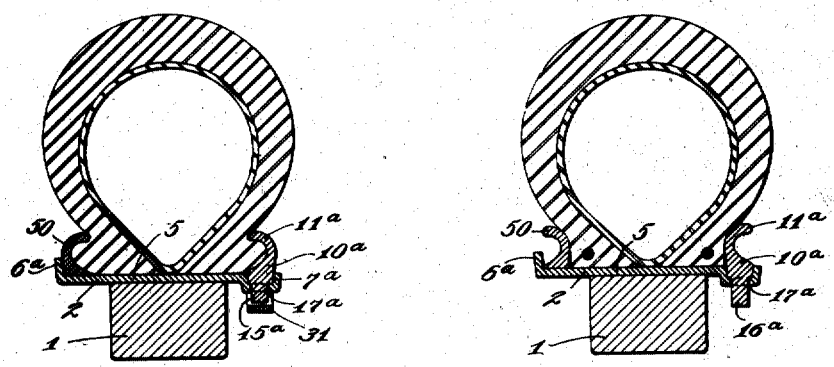
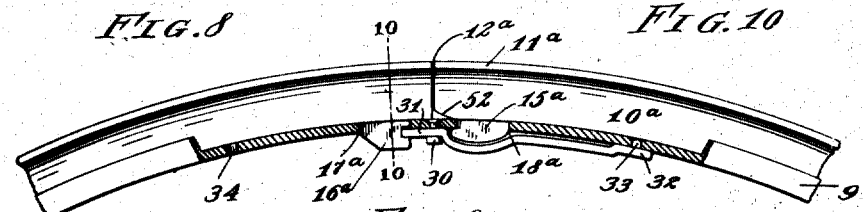
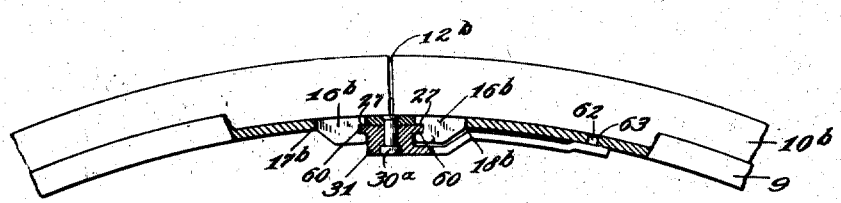
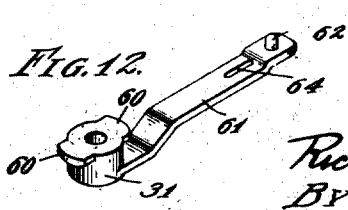

UNITED STATES PATENT OFFICE.

RICHARD S. BRYANT, OF CLEVELAND, OHIO, ASSIGNOR, BY MESNE ASSIGNMENTS, TO THE STANDARD PARTS COMPANY, OF CLEVELAND, OHIO, A CORPORATION OF OHIO.

RIM FOR VEHICLE-WHEELS.

1,278,430.    Specification of Letters Patent.    Patented Sept. 10, 1918.

Application filed April 25, 1912. Serial No. 693,078.

*To all whom it may concern:*

Be it known that I, RICHARD S. BRYANT, a citizen of the United States, residing at Cleveland, in the county of Cuyahoga and State of Ohio, have invented a certain new and useful Improvement in Rims for Vehicle-Wheels, of which the following is a full, clear, and exact description, reference being had to the accompanying drawings.

This invention relates to rims for vehicle wheels of the type designed to secure a pneumatic or other resilient tire in place thereon and permit the ready removal of the same therefrom for purposes of repair or replacement. According to the usual contemporary practice, such rims invariably take the form of a circular band embracing the wheel felly and provided with outwardly projecting lateral flanges adapted to engage the sides of the tire, these flanges having different shapes according to the particular type of tire with which they are to be used. The stiffness and rigidity of the tire renders its removal very difficult in case these rims and their flanges be made in one piece, since such construction necessitate that the tire be expanded so as to be pried over the flanges both upon removal and replacement. To obviate this difficulty, several expedients have been proposed chief among which are: the contraction of the rim by the removal of a portion, or the overlapping of the ends thereof, so as to avoid the necessity for stretching the tire; the formation of the rim in two parts which are detachably connected together along a line substantially coinciding with the plane of the wheel; the formation of one of the flanges separate from the rim so that the same can be readily detached and the tire removed from the flat rim base with comparatively little opposition. It is with the last of these expedients that the invention of the present application is concerned, and it will be noted that whereas the first two expedients necessitate the employment of a demountable or removable rim, the device of my invention is independent of the method of securing the rim about the felly.

The objects of the invention are the provision of novel and simplified mechanism for the secure attachment of this detachable flange to the rim with which it is used; the provision of attaching means which may be readily disconnected when occasion shall arise without the necessity for the employment of any special tools other than those which the operator always possesses, and which shall be proof against accidental disconnection or against being rendered inoperative by rust, dirt, ice, or other foreign matter; the provision of securing means all of which are permanently attached either to the rim or to the flange so that there shall be nothing which can be lost or mislaid; the provision of attaching means which, while perfectly secure under all incidents of use, will offer the least possible obstruction to the removal of the flange; the provision of securing means which shall permit the reversal of the flange so as to permit tires of different shapes to be employed; while further objects and advantages of the invention will become apparent in the course of the following description and claims. More specifically this invention is an improvement upon any of the modes of fastening disclosed or claimed in my prior application filed May 4, 1911, Ser. No. 625,078.

Generally speaking my invention may be defined as consisting of the combinations of elements recited in the claims hereto annexed and illustrated in the drawings forming a part hereof, wherein; Figure 1 represents a side elevation of a portion of a vehicle wheel having a rim made in accordance with my invention; Fig. 2 is a cross sectional view taken upon the broken line 2—2 of Fig. 1 drawn to larger scale; Fig. 3 is a side elevation of a portion of a rim constructed in accordance with my invention, certain parts being broken away to illustrate more clearly the flange-securing means; Fig. 4 is a cross sectional view taken substantially upon the line 4—4 of Fig. 1; Fig. 5 is a detail view of a portion of a rim and flange drawn to larger scale, the rim channel being formed in slightly different shape from that in Fig. 4; Fig. 6 is a bottom plan view of the parts shown in Fig. 3; Fig. 7 is a side elevation of a portion of a rim illustrating a modified form of my invention wherein the parts are reversible, portions being broken away as in Fig. 3; Fig. 8 is a cross sectional view taken upon the broken line 8—8 of Fig. 7 and drawn to larger scale; Fig. 9 is a view showing the same parts as Fig. 7 but in reverse position; Fig. 10 is a cross sectional view taken upon the broken line 10—10 of Fig. 9, the parts being drawn to larger scale; Fig. 11 represents a side elevation of still another modified form, parts being broken away as shown in Figs. 3 and 7; and Fig. 12 is a perspective view of the securing latch employed with the last modification.

Describing the parts by reference characters, 1 represents the felly of a wheel, which may be of wood as in the usual construction or of any other suitable material, and 2 indicates generally a metallic tire receiving rim surrounding the same. In Figs. 1, 2 and 4 hereof this rim is illustrated as mounted on a metallic felly band 3 having outwardly projecting flanges 4 at its sides, the attachment between the two being effected by any convenient or suitable means, such for example as that shown in my copending application filed May 4, 1911, Ser. No. 625,078, now Patent No. 1,237,613 of August 21, 1917. In Figs. 8 and 10 hereof I have illustrated this rim as secured directly about the felly without the interposition of any separate felly band. My present invention concerns merely the rim, and the manner of securing that rim to the wheel has no bearing upon this case.

Referring particularly to Figs. 1 to 6 hereof, it will be seen that this rim consists of a transversely flat, endless, metallic member 5 having at one side the outwardly projecting flange 6 here shown as curved inwardly so as to engage the bead of a tire of the clencher type, and having its opposite lateral portion depressed to form a groove 7, the shape whereof is preferably like that disclosed and claimed in my prior application No. 625,078, hereinbefore mentioned. Briefly stated, this groove is formed by rolling the metal so as to produce an abrupt wall 8 at the side adjacent to the flat portion 5 of the rim, and a rounded wall 9 at the opposite side, the upper edge of the said outer wall being not higher than the flat surface of the band 5. This wall is preferably formed upon the arc of a circle whose center lies substantially in the plane of the wall 8 and at or slightly above the surface of the band 5. In this groove is secured the removable or detachable flange 10, which has a base or body portion adapted to fit securely within the groove 7, and an outwardly extending portion 11 complementary to the flange 6. This flange is made in the form of a split ring, the closely abutting ends thereof being illustrated at 12, and the method of securing this ring in the groove 7 will now be described.

Formed upon the inner surface of the ring 10 adjacent to each of its ends is a projection, one of these projections being illustrated at 15 and the other at 16, and the bottom wall of the groove 7 is formed with apertures 17 and 18 for the reception of these projections respectively. The inner side of the aperture 17 is notched through the wall 8 as shown at 19, and the projection 15 is deflected laterally as shown in Figs. 4 and 5 so as to fit within the portion 19 of this aperture, the side of the projection being formed to hook beneath the edge of this notch as shown at 20. The opposite side of the projection is rounded as at 21 for a purpose to be hereinafter explained, the greatest width of the projection 15 being everywhere not greater than the width of the aperture 17.

The projection 16 is substantially radial as shown in Fig. 3 and lies substantially in the plane of the ring as shown in Fig. 2. The length of the projection is such as to cause it to fit snugly into the aperture 18, the forward end of this projection being formed substantially upon the radius of the ring for its whole height as shown at 24, the rearward wall being also radial for a short distance as shown at 25. The remainder of the rear side of the projection is beveled away as at 26. The forward side of the projection is formed with a notch 27, defining a toe 28, the inner edge of said notch being spaced from the surface of the ring a distance not greater than the thickness of the metal of the rim at the bottom of the groove 7 (see Fig. 3).

Pivoted to the bottom wall of the groove 7 at a point between the apertures 17 and 18, as by means of a rivet 30, is a latch 31, the forward end whereof is adapted to enter the notch 27 to retain the projection 16 in its aperture. The opposite end of the latch is extended for a considerable distance from the pivot, as shown at 32 and is provided with a stud 33 adapted to enter an aperture 34 formed in the bottom wall of the groove and to be retained therein by the resilience of the latch. The portion of the latch intermediate between the pivot 30 and stud 33 is preferably offset or deflected so as to be spaced from the rim as at 35, and this portion is formed with a notch or slot 36 or other suitable abutment for the reception of the blade of a screwdriver or like removing tool. The wall 9 of the groove is also formed with a notch 37 adjacent to the recess 18, the ring 10 being, if desired, formed with a similar notch adapted to register therewith, this construction being adopted to permit the introduction of a screw driver or like prying tool whereby the ring may be removed from the groove.

With the parts in the position shown in Fig. 3, if it be desired to remove the detachable flange, a screw driver is first introduced between the wall 9 and the latch so as to engage in the slot 36. This slot not only limits the introduction of the screw driver to the amount necessary for the operation, but also permits the blade to engage the same so as to pry the stud 33 from its aperture and swing the end of the latch outwardly away from the rim and disengage the forward edge thereof from the notch 27. The screw driver is then introduced into the notch 37 and the ring pried from out the groove 7, the resulting expansion of the circle defined thereby being permitted by the beveled portion 26 of the projection 16. The free end of the ring is now lifted over the wall 9 of the groove, and the remainer of the ring progressively freed from its seat until the projection 15 is reached. The ring is then inclined away from the rim about the projection 15 as a center so as to disengage the hook portion 20 of this projection from the wall of the notch 19, the rounded side 21 of the projection passing along the outer side of the aperture 17, whereupon the projection 15 can be removed radially and the flange is entirely detached. The application of the flange involves the same operations in the reverse direction, the projection 15 being first introduced into its aperture 17 with the flange in inclined position, the body of the ring then seated progressively in the groove until the projection 16 is reached, whereupon the camming action of the inclined portion 26 taken in connection with the contracting tendency of the ring, will cause the ends of the ring to be drawn together and the projection 16 to be fully seated in its aperture. The latch 31 is then swung into the position shown in Fig. 3, whereupon all parts are in condition for service. The space 35 between the latch and rim prevents the formation of rust at this point, and hinders the collection of foreign matter, while the location of the latch entirely within the edge of the rim renders it safe from accidental disengagement by contact with obstructions.

In Fig. 5 I have illustrated an expedient by means of which I provide a seating surface for the reception and greater protection of the latch 31. To this end I press the bottom of the groove 7 downwardly so as to form a flat surface 40 for the reception of the latch. This operation may either be effected by means of dies whereby the deformation of the groove is limited only to the portions immediately adjacent the apertures 17 and 18, or by rolling the rim so as to form the groove in this manner at all points. In either case the upper portion of the outer wall 9 will retain the same curved shape, and the operation of the abutting surfaces thereof will be the same as in the previous case.

In Figs. 7 to 10 of the drawings I have illustrated the application of my improved securing means to a case wherein it is desired to make the flange reversible so as to permit the use thereof with tires of different shape, such as those of the "clencher" and "straight wall" varieties. In this case a rim is provided having a transversely flat curved portion 5 as before, one side thereof being provided with a comparatively shallow outstanding lip 6ª, and the other side with a depressed groove portion 7ª, the groove being symmetrical, and the walls thereof as well as the lip 6ª flaring outwardly at a small angle, preferably about six degrees. Surrounding the portion 5 of the rim, adjacent to the lip 6ª is a loose or floating ring 50, the two sides whereof are shaped to conform substantially to the sides of the tires with which the rim is to be used as shown in Figs. 8 to 10. Seated in the groove 7ª is a removable or detachable flange 10ª, having a base or body portion adapted to fit securely within the groove 7ª and an outwardly extending portion 11ª, the sides whereof are shaped similarly to the sides of the ring 50. The outer portion of this flange preferably overhangs the outer wall of the groove 7ª to an extent to shield the latter in large part from injury due to contact with obstructions.

This flange is made in the form of a split ring, as before, the closely abutting ends thereof being illustrated at 12ª, and the bottom wall of the groove is likewise provided with apertures 17ª and 18ª for the reception of projections 15ª and 16ª carried by the ends of the ring, the length of the apertures being the same. Owing to the fact that the flange 10ª is to be reversible it is necessary that the projection 15ª project radially straight inward instead of being curved laterally as illustrated in Figs. 1 to 6, and the walls of both grooves are likewise made straight and parallel. The body of the projection 15ª is therefore made of a size substantially to fill the aperture into which it is inserted, the forward end of the projection being extended to form a toe 51 adapted to engage beneath the metal between the apertures as illustrated in my former application Ser. No. 625,078 before referred to. The end of the ring adjacent to the projection 15ª is beveled as at 52 to permit the inclination thereof in a forward direction whereby the toe 51 is inserted and removed from the aperture 17ª. The shape of the projection 16ª is exactly the same as that of the projection 16 already described, and the construction and operation of the latch 31 is exactly the same as that shown in Fig. 3, except that in the present case, the pivot 30 is disposed exactly midway between the apertures 17ª and 18ª and the bottom wall of the groove is formed with an aperture 34 at each side of the pivot so as to permit the latch to be secured either in the position shown in Fig. 7 or that shown in Fig. 9. This construction permits the flange to be secured in either position as will be obvious.

It will be seen that the projections 15 and 15ᵃ are alike in this respect: that each comprises a body adapted to substantially fill the slot into which it is introduced, said body having an extension offset from the line of its body so as to be hooked under the bottom wall of the groove adjacent to the slot when the projection is fully seated and to be unhooked therefrom when the flange and projection are appropriately inclined. With the construction illustrated in Figs. 1 to 6 hereof this inclination is at right angles to the plane of the wheel, while in that illustrated in Figs. 7 to 10 hereof and in my former application this inclination necessarily takes place within the plane of the wheel. The two expedients are, however, essentially alike. Furthermore the method of securing the projection 16 in its slot is an important feature of my invention entirely independently of the method of securing the other end of the ring 10, and I have attempted to bring out this fact in certain of my claims.

It will also be seen that the method of securing the projection 16 in its slot resembles in some degree the expedients disclosed in the former application in that each comprises a member having a forwardly projecting toe adapted to be engaged to prevent the withdrawal of the projection from the slot; although the specific methods of attaining and preserving this engagement differ considerably.

In Fig. 11 I have illustrated a still further expedient for securing a detachable split flange to a rim, this expedient being applicable either to the case shown in Figs. 1 to 6 wherein the flange is non-reversible, or to that shown in Figs. 7 to 9 wherein the groove is symmetrical so as to permit reversal. In this modification the wall of the groove is indicated at 9, and the flange at 10ᵇ, the same being made in the form of a split ring having closely abutting ends 12ᵇ. The bottom wall of the groove is formed with apertures 17ᵇ and 18ᵇ, which in the case of a reversible flange are made of the same length, but in the case of a non-reversible flange may be different lengths if desired. The inner side of the ring is provided adjacent to each of its ends with a projection 16ᵇ, 16ᵇ of a size to fit snugly within its appropriate aperture and each having upon its inner end a notch 27 facing the similar notch of the other projection. Mounted upon a suitable pivot 30ᵃ between these apertures is a latch member 31 having at each side a lip 60 adapted to engage one of the notches 27, and also having an extended resilient handle 61 adapted to overlie one of the projections 16ᵇ the end of the handle being provided with a stud 62 adapted to engage the recess 63 formed in the bottom wall of the groove. The handle may also be formed with a slot or recess 64 for the reception of a prying tool as before.

With this construction, the method of attaching or detaching the flange is obvious, the two ends being clearly removable as soon as the latch is disengaged without reference to the order in which they are detached. The projections 16ᵇ, 16ᵇ, apertures 17ᵇ, 18ᵇ, and lips 60, 60 being symmetrical, it is obvious that the flange can also be reversed in case the groove also be symmetrical as in Figs. 8 and 10.

It is apparent that I have produced a construction of detachable flange of the most extreme simplicity and which can be operated with the greatest ease and with a very small number of tools. It is also apparent that a flange constructed and attached to a rim in accordance with my invention will be securely retained thereon under all possible conditions of use and be removed with the utmost readiness without obstruction by reason of rust, sand, ice or other foreign matter. While I have necessarily described my invention in detail, and particularly pointed out the construction which appears preferable at the present time, I do not propose to be limited to such details or restricted to such constructions except as the same may be positively included in the claims hereto annexed or may be rendered necessary by the prior state of the art.

Having thus described my invention, what I claim is:—

1. In a vehicle rim, in combination, an annular slotted tire-supporting member, a split ring adapted to surround said member and having adjacent to each of its ends a projection adapted to project through said member, one of said projections having an extension displaced from its body and adapted to be engaged beneath the surface of said member adjacent thereto, the other of said projections having a toe projecting from its forward end, and a movable latch adapted to be inserted between said toe and the inner surface of said annular member to retain said last named projection in place.

2. In a vehicle rim, in combination, an annular tire-supporting member having a fixed flange at one side and a groove at the other side, said groove having a pair of slots through its bottom wall, a split ring adapted to surround said member, the inner portion of said ring being shaped to fit in said groove and the outer portion to engage a tire, each end of said ring having a projection adapted to enter one of said slots, one of said projections having an extension displaced from its body adapted to be engaged beneath the surface of said member adjacent to the slot into which it is inserted and the other of said projections having a toe projecting from its forward end, and a movable latch adapted to engage said toe to retain said projection in its slot.

3. In a vehicle rim, in combination, an annular tire-supporting member having a pair of slots therethrough separated by a transverse web, a split ring adapted to surround said member and having adjacent to each of its ends a projection adapted to enter one of said slots, one of said projections having a toe projecting from its forward end, the other of said projections being formed for interlocking engagement with said member, and latch means adapted to be inserted between said web and said toe for holding said projections in their respective slots.

4. In a vehicle rim, in combination, a circular, radially slotted, tire supporting member, a split ring adapted to surround said member and having adjacent to each of its ends an internal lug adapted to project through said member and to abut against the end wall of the slot into which it is inserted, means for securing one of said lugs in place, the other lug having upon its end nearest the end of the ring a forwardly projecting toe, and latching means carried by said member and adapted to be introduced beneath said toe whereby the opposite end of said lug will be maintained against its end wall.

5. In a vehicle rim, in combination, an annular tire-supporting member having a pair of slots therein separated by a transverse web, a split ring adapted to surround said member and having adjacent to each of its ends a projection adapted to enter one of said slots, one of said projections having an extension off-set from its body for engaging the inner surface of said member when said projection is fully seated, the other projection having a notch in its forward end, and latching means pivoted to said web between said slots and adapted to engage said notch for retaining the latter projection in its slot.

6. In a vehicle rim, in combination, an annular tire-supporting member having a slot therein, a split ring adapted to surround said member and having adjacent to one of its ends a projection adapted to enter said slot, said projection having its rearward end inclined and also having a notch in one of its other faces, interengaging means carried by said member and ring for securing against movement the end of said ring opposite to said projection, a latching member pivoted to said annular member and having an end adapted to engage said notch for retaining said projection in said slot, the other end of said latch being formed as an extended resilient handle, and interlocking means between said handle and said member whereby said latch is maintained in engagement with said projection.

7. In a vehicle rim, in combination, an annular tire-supporting member having a slot, a split ring adapted to surround said member, and having adjacent to one of its ends a projection adapted to enter said slot, said projection having a forwardly projecting toe, inter-engaging means carried by said member and ring for securing against movement the end of said ring opposite to said projection, a latching member pivoted to said tire-supporting member adjacent to said slot and having a portion adapted for insertion beneath said toe and also having a handle portion adjacent to the inner surface of said member, and means for securing said handle to said member and maintain said latch in engagement with said toe, whereby said projection is retained in said slot.

8. In a vehicle rim, in combination, a radially slotted tire supporting member, a split ring adapted to surround said member and having adjacent to each of its ends an internal lug adapted to project through said member, one of said lugs having at its inner end a projection extending laterally from the plane of the ring and adapted to engage the inner face of said member at one side of the slotted portion when said ring is fully seated thereon, said lug being removable from its slot only when said ring is inclined relatively to the plane of said annular member, and means for engaging the other of said lugs to retain the same in place.

9. In a vehicle rim, in combination, a slotted annular tire-supporting member, a split ring adapted to surround said member and having projections adjacent to its ends adapted to enter such slots, one of said projections having a lateral off-set extension whereby the same may be inserted into its slot when said ring is inclined to the plane of the annular member and will be interlocked with the side of said slot when the ring is fully seated, the other of said projections being of a length to be inserted directly into its slot and having a notch in its forward end defining a forwardly projecting toe, and latching means adapted to be inserted into said notch to engage said toe and prevent said projection from being withdrawn.

10. In a vehicle rim, the combination of an annular tire-supporting member having an opening; a split ring adapted to surround said member and provided with a lug at one end adapted to project through such opening, said lug having a forwardly projecting toe upon the side nearest the end of the lug; means for rigidly securing the other end of said ring to said member; and a latch, pivotally attached to said member and adapted to be inserted beneath said toe and prevent its withdrawal from said opening.

11. In a vehicle rim, the combination of an annular tire-supporting member having an opening; a split ring adapted to surround said member and provided with a lug at one end adapted to project through such opening, said lug having its rear face beveled and having a notch in its forward face; means for fixedly securing the other end of said ring to said member, and a swinging latch, carried by said member, and adapted to engage such notch.

In testimony whereof, I hereunto affix my signature in the presence of two witnesses.

RICHARD S. BRYANT.

Witnesses:
HAROLD V. SMITH,
J. D. HULL.